United States Patent

Yamada et al.

[11] Patent Number: 6,025,692
[45] Date of Patent: Feb. 15, 2000

[54] MOTOR CONTROL APPARATUS AND METHOD OF CONTROLLING MOTOR

[75] Inventors: Eiji Yamada, Owariasahi; Yasutomo Kawabata, Aichi-ken, both of Japan

[73] Assignee: Toyota Jidosha Kabushiki Kaisha, Toyota, Japan

[21] Appl. No.: 09/158,283

[22] Filed: Sep. 22, 1998

[30] Foreign Application Priority Data

Oct. 9, 1997 [JP] Japan .................................. 9-293544

[51] Int. Cl.$^7$ ...................................................... H02P 7/00
[52] U.S. Cl. ........................... 318/721; 318/700; 318/720; 318/722
[58] Field of Search .................... 318/138, 245, 318/254, 439, 700–732, 696

[56] References Cited

U.S. PATENT DOCUMENTS

| | | | |
|---|---|---|---|
| 4,772,839 | 9/1988 | MacMinn et al. | 318/696 |
| 5,144,564 | 9/1992 | Naidu et al. | 364/494 |
| 5,220,264 | 6/1993 | Yamada | 318/609 |
| 5,296,794 | 3/1994 | Lang et al. | 318/715 |
| 5,339,012 | 8/1994 | Schroedl et al. | 318/254 |
| 5,561,355 | 10/1996 | Ideguchi et al. | 318/721 |
| 5,569,995 | 10/1996 | Kusaka et al. | 318/717 |
| 5,608,300 | 3/1997 | Kawabata et al. . | |
| 5,648,705 | 7/1997 | Sitar et al. | 318/145 |
| 5,714,857 | 2/1998 | Mannel et al. | 318/432 |
| 5,726,549 | 3/1998 | Okuno et al. | 318/721 |
| 5,764,020 | 6/1998 | Maiocchi | 318/705 |
| 5,783,917 | 7/1998 | Takekawa | 318/439 |
| 5,793,167 | 8/1998 | Liang et al. | 318/141 |
| 5,796,194 | 8/1998 | Archer et al. | 310/68 B |
| 5,854,548 | 12/1998 | Taga et al. | 318/721 |
| 5,864,217 | 1/1999 | Lyons et al. | 317/652 |
| 5,903,128 | 5/1999 | Sakakibara et al. | 318/721 |
| 5,903,129 | 5/1999 | Okuno et al. | 318/721 |
| 5,907,225 | 5/1999 | Kim | 318/254 |
| 5,952,810 | 9/1999 | Yamada et al. | 318/700 |
| 5,955,860 | 9/1999 | Taga et al. | 318/700 |

FOREIGN PATENT DOCUMENTS 7-177788  7/1995  Japan .

Primary Examiner—Paul Ip
Attorney, Agent, or Firm—Oblon, Spivak, McClelland, Maier & Neustadt, P.C.

[57] ABSTRACT

When a required torque increases under the condition of high-speed rotation, the conventional technique can not detect an electrical angle or control a synchronous motor in a sensor-less manner. The direction that passes through the rotating axis of the motor and makes a magnetic flux run through a permanent magnet is defined as the d-axis, whereas the direction that is electrically perpendicular to the d-axis in the rotational plane of the motor is defined as the q-axis. The technique of the present invention applies voltages to the d-axis and the q-axis based on an estimated electrical angle and solves voltage equations with the observed electric currents. The technique then calculates a correction amount of the electrical angle according to errors of the arithmetic operations and controls the motor. The arithmetic operations are carried out by varying the inductance according to the required torque of the motor. One concrete procedure determines the inductance corresponding to a specific motor driving state by interpolation of the table that stores the inductances corresponding to a variety of motor driving states. Another concrete procedure substitutes the driving states at the respective time points into the function that represents the relationship between the inductance and the driving state, so as to determine the inductance.

6 Claims, 8 Drawing Sheets

MOTOR CONTROL APPARATUS AND METHOD OF CONTROLLING MOTOR

BACKGROUND OF THE INVENTION

1. Field of the Invention

The present invention relates to a technique of controlling a synchronous motor in a sensor-less manner, or more specifically to a technique of controlling a synchronous motor that is rotated at a high speed.

2. Description of the Related Art

In a synchronous motor that rotates a rotor through an interaction between a magnetic field occurring when multi-phase alternating currents are flown through windings and a magnetic field produced by a permanent magnet, in order to obtain a desired rotational torque, it is required to control the multi-phase alternating currents according to the electrical angle or the electrical position of the rotor. The electrical angle may be detected with a sensor, such as a Hall element. It is, however, desirable to detect the electrical angle and control operation of the synchronous motor in a sensor-less manner, with the view to assuring the reliability of a control apparatus of the synchronous motor.

In the case where the motor is driven at a high speed (hereinafter simply referred to as high-speed rotation), one proposed method detects an error of an electrical angle in a sensor-less manner using voltage equations (1) and (2) given below and thereby controls the motor:

$$Vd = R \cdot Id + p(Ld \cdot Id) - \omega \cdot Lq \cdot Iq \quad (1)$$

$$Vq = R \cdot Iq + p(Lq \cdot Iq) - \omega \cdot Ld \cdot Id + \omega \phi \quad (2)$$

where V denotes voltages applied to the motor, I electric currents flowing through the windings of the motor, and L inductances of the windings. The subscripts d and q attached to V, I, and L show that the values relate to the d-axis direction and the q-axis direction of the motor. R denotes the coil resistance of the motor, $\omega$ the rotational angular velocity of the motor, and $\omega$ the number of flux linkages. Among these arithmetic elements, the coil resistance of the motor R, the inductances L, and the number of flux linkages $\omega$ are intrinsic to the motor and are thereby referred to as the motor constants. The time derivative operator p is defined as:

$$p(Ld \cdot Id) = d(Ld \cdot Id)dt$$

The d-axis and the q-axis are described briefly with the drawing of FIG. 4. A permanent magnets-type three-phase synchronous motor is expressed by an equivalent circuit shown in FIG. 4. In this equivalent circuit, the direction that passes through the center of rotation of a rotor and goes along a magnetic field formed by a permanent magnet is generally referred to as the d-axis, whereas the direction that is electrically perpendicular to the d-axis in the rotational plane of the rotor is generally referred to as the q-axis. In the equivalent circuit of FIG. 4, the angle of the U-phase and the d-axis corresponds to an electrical angle $\theta$ of the motor.

The following describes the idea of the motor control technique using the voltage equations (1) and (2). The voltage equations (1) and (2) are always valid with respect to the d-axis and the q-axis, but the accurate value of the electrical angle is unknown in the case of the sensor-less control of the motor. The motor control apparatus accordingly solves the voltage equations (1) and (2) with an estimated electrical angle (corresponding to $\theta c$ in FIG. 4). Errors of the arithmetic operations accordingly exist corresponding to an angular error ($\Delta\theta$ in FIG. 4) between the estimated electrical angle $\theta c$ and the true electrical angle $\theta$. It is possible, on the contrary, to determine the error angle based on the errors of the arithmetic operations. Correction of the estimated electrical angle $\theta c$ with the error angle thus enables the error of the electrical angle to be kept within a specific range and thereby assures adequate control of the motor.

The proposed motor control method corrects the electrical angle and controls the motor in the sensor-less manner in the case where the permanent magnets-type motor is driven at a relatively high speed. In the synchronous motor in this driving state, however, when the torque to be output from the motor exceeds a predetermined torque level depending upon the rating of the motor, this method can not adequately control the motor.

One possible countermeasure to solve the above problem designs the motor to have a sufficiently marginal rating relative to the torque to be output. This, however, undesirably increases the size and the weight of the motor. Especially when the motor is mounted on an electric vehicle, the size and weight reduction of the motor is highly required because of the limited space and weight.

SUMMARY OF THE INVENTION

The object of the present invention is thus to provide a technique that detects an electrical angle of a synchronous motor with a high accuracy and assures adequate control of the synchronous motor even when output of a high torque is required while the synchronous motor is driven at a high speed.

At least part of the above and the other related objects is realized by a technique of the present invention that calculates a quantity of correction of an estimated electrical angle from a voltage applied to a winding based on the estimated electrical angle, an electric current flown through the winding in response to the applied voltage, and an inductance of the winding, which depends upon characteristics of a synchronous motor. The technique specifies the inductance based on a parameter that represents a motor driving state.

This structure enables accurate detection of the electrical angle and adequate control of the motor even when the synchronous motor is required to output a high torque as discussed below. It is necessary to elucidate the cause of unsuccessful detection of the electrical angle under the requirement of a high torque by the conventional technique. There have been no reports on the phenomenon and the cause that the conventional method can not detect the electrical angle when output of a high torque is required. The inventors of the present application have elucidated the cause as discussed below, based on a variety of experiments and analyses.

As described previously, the conventional motor control method uses the voltage equations (1) and (2), where the motor constants R, L, and $\phi$ are independent of the motor driving state. The following describes the inductances L of the windings in the motor.

FIG. 10 is a graph showing relations between an external magnetic field H and a magnetic flux density B in the rotor of the motor. A curve Cd represents the relationship with respect to the d-axis direction, and a curve Cq represents the relationship with respect to the q-axis direction. The external magnetic field H includes a magnetic field formed by a permanent magnet on the rotor of the motor and a magnetic field produced by the electric currents flown through the windings. Since the magnetic field by the permanent magnet is constant, it may be regarded that the abscissa represents the electric currents flowing through the windings. The electric current flowing through the winding thus increases with an increase in output torque of the motor.

As is generally known, the inductances Ld and Lq are given as the slopes of tangents at the respective points in the curves Cd and Cq in the graph of FIG. 10. As clearly understood from the graph of FIG. 10, in a range where the external magnetic field H has a relatively small strength (area A), both the inductances Ld and Lq have fixed values. With an increase in strength of the external magnetic filed H, the curve Cq shows non-linearity and the inductance Lq decreases (area B). This phenomenon is generally referred to as the magnetic flux saturation. The strength of the external magnetic field is related to the electric currents flown through the windings. This phenomenon accordingly implies that the inductance Lq decreases with an increase in electric current flowing through the winding to or above a predetermined level.

This phenomenon is shown as the graph of FIG. 11, where the motor current is plotted as abscissa and the inductance as ordinate. The inductance Lq has a substantially fixed value until the motor current reaches a predetermined value A1 (corresponding to the area A in the graph of FIG. 10). The inductance Lq then decreases with a further increase in motor current above the predetermined value A1 (corresponding to the area B in the graph of FIG. 10). When the required torque of the motor increases and the electric current flowing through the q-axis exceeds the predetermined value A1, the phenomenon of magnetic saturation occurs and the inductance Lq of the q-axis does not have a fixed value any longer.

The conventional method is on the assumption that the motor has a sufficiently marginal rating relative to the torque requirement. It is accordingly assumed that the magnetic flux density of the motor is present in the linear area (that is, the area A in the graph of FIG. 10) and that the inductance has a fixed value. The inventors of the present application have performed a variety of experiments and analyses by taking into account the fact that the size reduction of the motor leads to unsuccessful detection of the electrical angle under the requirement of a high torque. A lot of causes can be thought to explain the unsuccessful detection of the electrical angle under the requirement of a high torque. The inventors of the present application have elucidated that the fundamental cause is magnetic flux saturation occurring in the rotor of the motor, which causes the inductance Lq in the q-axis direction to be deviated from the fixed value.

The motor control apparatus and the motor control method of the present invention, which take into account the above fundamental cause, do not set the inductance to a fixed value but specify the inductance based on a parameter, which represents a motor driving state, such as a torque of the motor, while calculating the quantity of correction of the electrical angle. This arrangement enables accurate detection of the electrical angle of the motor even when a high torque is required. The relation of specifying the inductance based on the parameter may be determined experimentally or analytically. For example, inductances L2 and L1 may hold the relation of L2≦L1, where the inductances L2 and L1 respectively correspond to two arbitrary torques T1 and T2 that are on or above a predetermined level and satisfy the relation of T2>T1. As shown in the graph of FIG. 11, the inductance does not increase but decreases with an increase in torque, that is, with an increase in electric current flowing through the winding. The applicable curve is not restricted to that in the graph of FIG. 11. As long as this relation is maintained, the inductance may be decreased stepwise at the torque of not less than a predetermined level. Compared with the conventional motor control method, the method of approximating a variation in inductance according to a variation in driving state, such as a torque, improves the accuracy of detection of the electrical angle and ensures adequate control of the motor.

The method using the voltage equations (1) and (2) discussed previously or another method using a variety of equivalent equations may be adopted to calculate the quantity of correction of the electrical angle. The parameter representing the motor driving state may be the output torque of the motor, the revolving speed of the motor, or any other quantity that affects the inductance. The inductance actually varies even in the range of relatively small torque, although not being so significant as that in the range of high torque. The technique of the present invention is thus also applicable to the range of relatively small torque.

A variety of methods may be adopted to determine the inductance based on the parameter. One applicable method stores a table, which represents a relationship between finite driving states expressed by the parameter and inductances corresponding to the finite driving states, in a memory and interpolates the table, so as to determine the inductance.

A variation in inductance according to the driving state is rather faithfully stored in the table. This ensures detection of the electrical angle with a high accuracy. This table is experimentally obtained by the method discussed later. The table used here may be a one-dimensional table corresponding to one parameter, which represents the driving state, or may be a higher-dimensional table. The interpolation adopted here is preferably linear interpolation, in order to attain the high-speed processing. Interpolation of a higher accuracy may, however, be adopted by taking into account a non-linear variation in inductance.

Another applicable method stores a function of the inductance with the parameter as a variable in the memory and substitutes the value of the parameter into the variable of the function, so as to determine the inductance.

This structure favorably reduces the amount of data to be stored in the memory, compared with the structure that uses the table. When the function is expressed in a relatively simple form, this arrangement saves the time required for the calculation of the inductance. The function may include one parameter as a variable or two or more parameters as variables.

One preferable application of the present invention calculates the quantity of correction from the inductance that is determined by taking into account the parameter when the torque to be output from the motor is not less than a predetermined level, and otherwise from the inductance fixed to a predetermined constant. The predetermined level is specified, based on the upper limit of the torque that enables detection of the electrical angle even when the inductance is fixed to the constant. When the motor is required to output a high torque of not less than the predetermined level, this method determines the inductance according to the motor driving state, thereby enabling accurate detection of the electrical angle and adequate control of the motor. When the required torque for the motor is less than the predetermined level, on the other hand, the method fixes the inductance to the predetermined constant, thereby enhancing the processing speed. Strictly speaking, the inductance of the motor varies even under the low-torque driving condition. This structure is especially effective when the variation is relatively small and the inductance is approximated to be substantially constant.

The principle of the present invention is applicable to not only the inner rotor-type synchronous motor, which has a rotor on the center and a stator on the circumference thereof, but also the outer rotor-type synchronous motor. The outer rotor-type synchronous motor has a stator on the center and a ring-shaped outer rotor surrounding the stator. In the outer rotor-type synchronous motor, control electric currents are flown through three-phase coils to form a revolving magnetic field and thereby rotate the ring-shaped outer rotor.

These and other objects, features, aspects, and advantages of the present invention will become more apparent from the following detailed description of the preferred embodiment with the accompanying drawings.

DESCRIPTION OF THE PREFERRED EMBODIMENT

1. Structure of Embodiment

Figure 1:
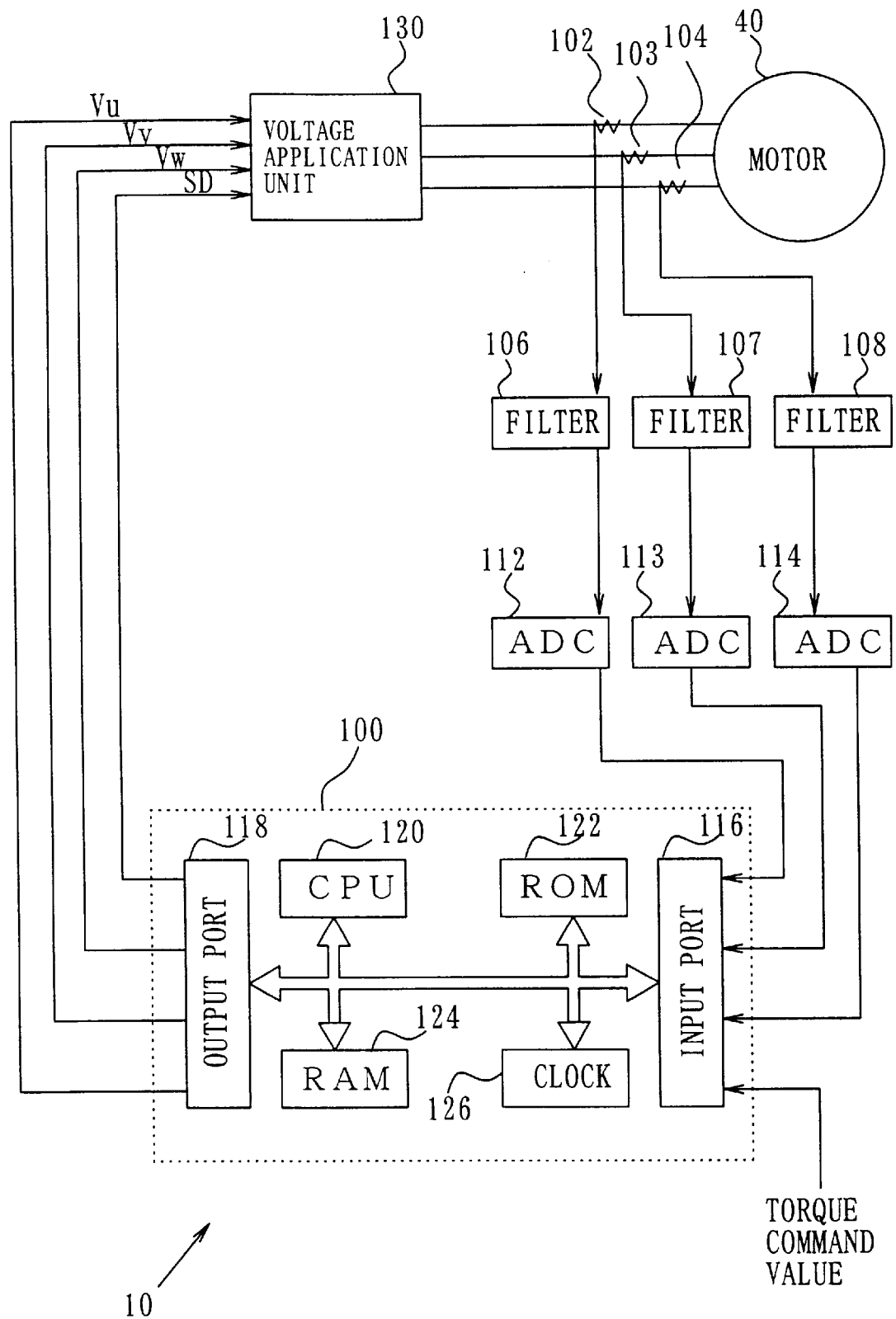
FIG. 1 is a block diagram schematically illustrating the structure of a motor control apparatus 10 as a first embodiment according to the present invention.

One mode of carrying out the present invention is discussed below as a preferred embodiment. Referring to FIG. 1, the motor control apparatus 10 includes a control ECU 100 that regulates the motor currents supplied to the three phases, U. V, and W-phases, of the three-phase synchronous motor 40 in response to an external torque instruction, electric current sensors 102, 103, and 104 that respectively measure a U-phase current Au, a V-phase current Av, and a W-phase current Aw of the three-phase synchronous motor 40, filters 106, 107, and 108 that eliminate high-frequency noises from the observed electric currents, and three analog-digital converters (ADC) 112, 113, and 114 that convert the observed electric currents to digital data.

The control ECU 100 includes a microprocessor (CPU) 120 that carries out arithmetic and logic operations, a ROM 122 in which the processing of the CPU 120 and required data are stored in advance, a RAM 124, which data required for the processing are temporarily written in and read from, and a clock 126 that counts the time. These elements are mutually connected via a bus. An input port 116 and an output port 118 are also connected to the bus. The CPU 120 reads the observed electric currents Au, Av, and Aw flowing through the respective phases, U. V, and W-phases, of the three-phase synchronous motor 40 via these ports 116 and 118.

The control ECU 100 has a voltage application unit 130 arranged on its output side. The voltage application unit 130 applies voltages between the respective coils of the three-phase synchronous motor 40, so as to obtain the phase currents Au, Av, and Aw of the three-phase synchronous motor 40 determined corresponding to an independently input torque command value. The CPU 120 gives control outputs Vu, Vv, Vw, and SD to the voltage application unit 130, in order to externally regulate the voltages applied to the respective coils of the three-phase synchronous motor 40.

Figure 2:
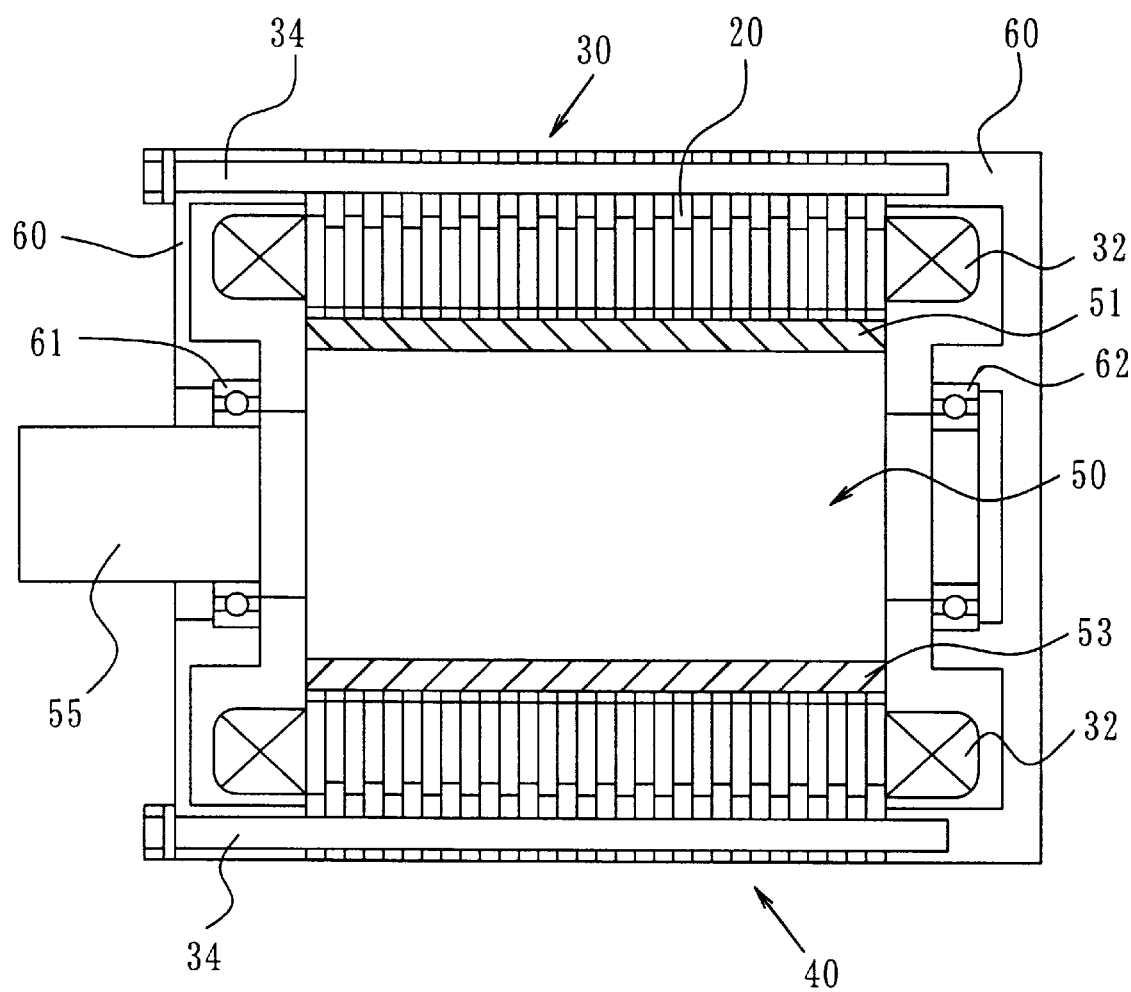
FIG. 2 schematically illustrates the structure of a three-phase synchronous motor 40.

Referring to FIG. 2, the three-phase synchronous motor 40 includes the stator 30, the rotor 50, and a casing 60 for accommodating the stator 30 and the rotor 50 therein. The rotor 50 has permanent magnets 51 through 54 attached to the outer circumference thereof and is provided with a rotating shaft 55. The rotating shaft 55 passes through the axial center of the rotor 50 and is rotatably supported by bearings 61 and 62 disposed in the casing 60.

Figure 3:
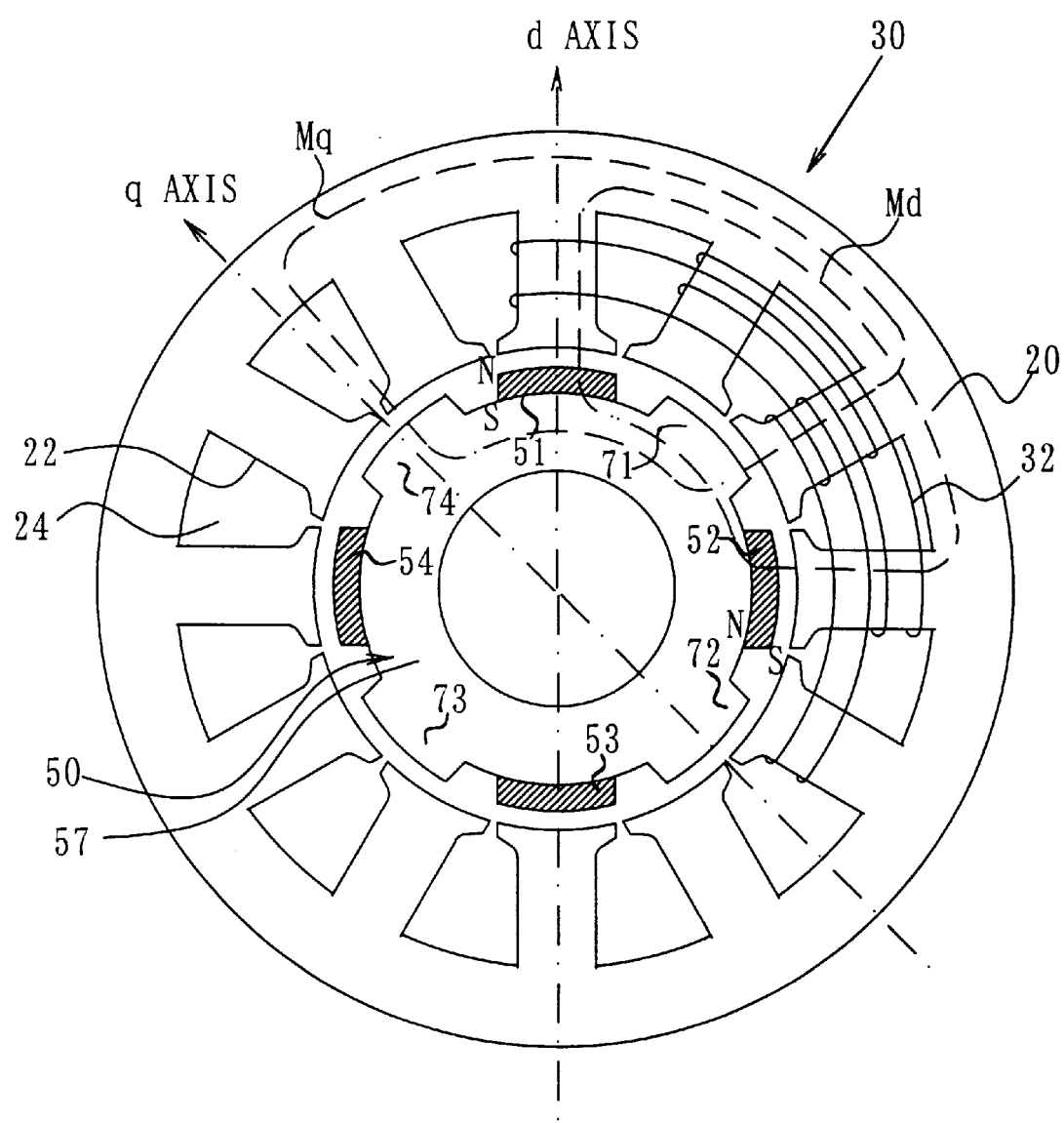
FIG. 3 is an end view showing the positional relationship between a stator 30 and a rotor 50 in the three-phase synchronous motor 40.

The rotor 50 is prepared by laying a plurality of plate-like rotor elements 57, which are punched out of a non-directional electromagnetic steel plate, one upon another. Each rotor element 57 has four salient poles 71 through 74 arranged in a cross configuration as shown in FIG. 3. The rotating shaft 55 is pressed into the laminate of the rotor elements 57, so as to temporarily fix the laminate of the rotor elements 57. Each rotor element 57 composed of the electromagnetic steel plate has an insulating layer and an adhesive layer formed on the surface thereof. The laminate of the rotor elements 57 is heated to a predetermined temperature, which fuses the adhesive layers and thereby fixes the laminate of the rotor elements 57.

After the assembly of the rotor 50, the permanent magnets 51 through 54 are attached to the outer circumferential surface of the rotor 50 along the axis of the rotor 50 at the positions between the salient poles 71 through 74. The permanent magnets 51 through 54 are magnetized in the radial direction of the rotor 50 in such a manner that the adjoining magnets form magnetic poles of different polarities. For example, the outer circumferential face of the permanent magnet 51 forms an N pole, whereas the outer circumferential face of the adjoining permanent magnet 51 forms an S pole. In the state that the rotor 50 is combined with the stator 30, the pair of the permanent magnets 51 and 52 form a magnetic path Md that passes through the rotor elements 57 and stator elements 20 (described below) as shown by the one-dot chain line in FIG. 3.

The stator 30 is prepared by laying a plurality of plate-like stator elements 20, which are punched out of a non-directional electromagnetic steel plate like the rotor elements 57, one upon another. Each stator element 20 has twelve teeth 22 as shown in FIG. 3. Coils 32 for causing the stator 30 to generate a revolving magnetic field are wound on slots 24 formed between the teeth 22. Bolt holes, each of which receives a fixation bolt 34, are formed in the outer circumference of the stator element 20, although being omitted from the illustration of FIG. 3.

The stator 30 is temporarily fixed by heating the laminate of the stator elements 20 under pressure and fusing the adhesive layers thereof. In this state, the coils 32 are wound on the teeth 22 to complete the stator 30. The stator 30 is then placed in the casing 60 and fixed to the casing 60 by fitting the fixation bolts 34 in the bolt holes. The rotor 50 is then rotatably attached to the casing 60 by means of the bearings 61 and 62. This completes the assembly of the three-phase synchronous motor 40.

Figure 4:
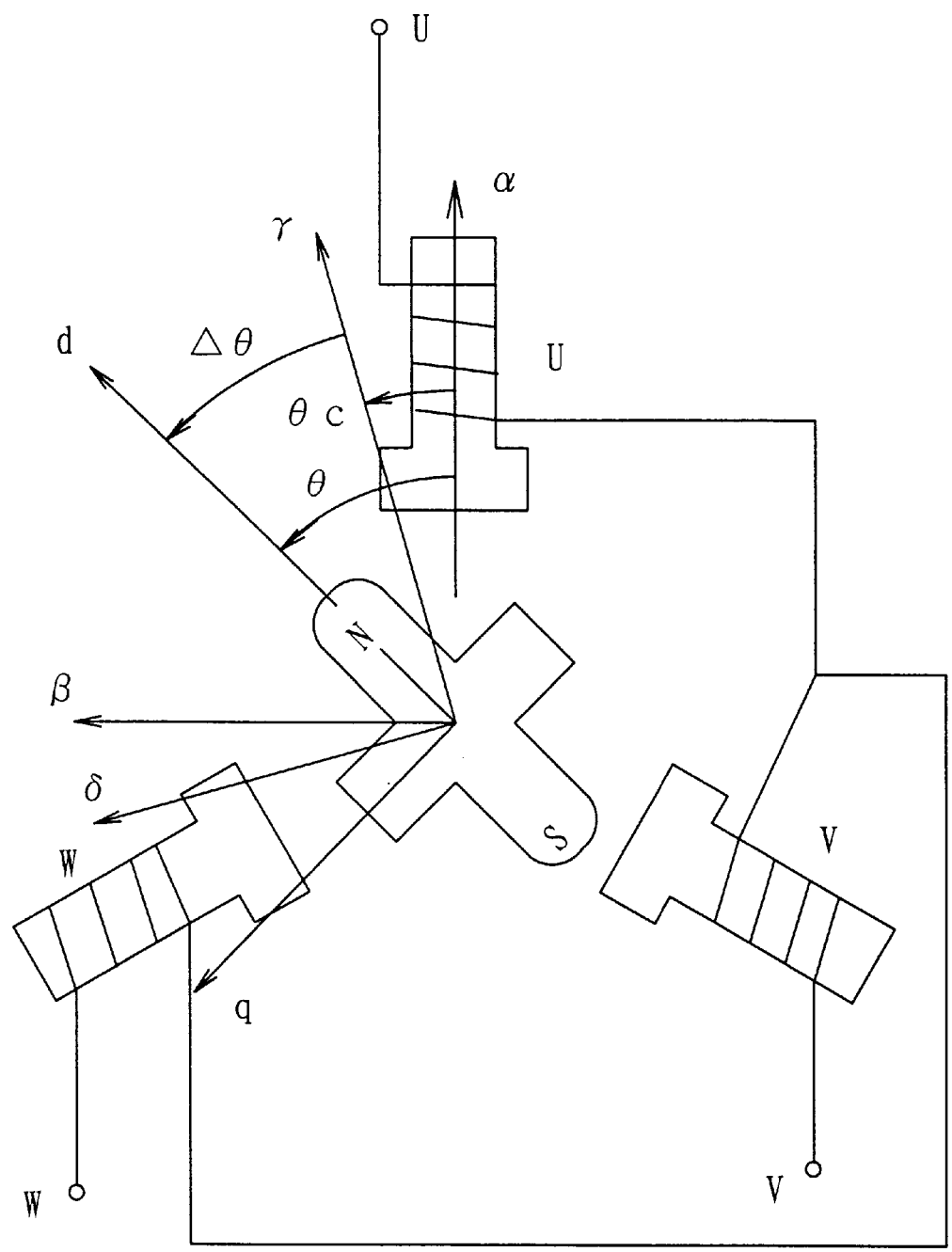
FIG. 4 is an equivalent circuit diagram of the three-phase synchronous motor 40.

When an excitation current is flown to generate a revolving magnetic field on the stator coils 32 of the stator 30, a magnetic path Mq is formed to pass through the adjoining salient poles as well as the rotor elements 57 and the stator elements 20 as shown by the broken line in FIG. 3. The direction that passes through the center of the rotational axis of the rotor 50 and makes the magnetic flux formed by the permanent magnet 51 run in the radial direction of the rotor 50 is defined as the d-axis, whereas the direction that is electrically perpendicular to the d-axis in the rotational plane of the rotor 50 is defined as the q-axis. Namely the d-axis and the q-axis rotate with rotation of the rotor 50. FIG. 4 shows an equivalent circuit of the three-phase synchronous motor 40 of this embodiment. The three-phase synchronous motor 40 is expressed by an equivalent circuit including three-phase coils of U, V, and W-phases and a permanent magnet rotating about an axis of rotation. In the equivalent circuit, the d-axis is defined as the axis that passes through the N pole of the permanent magnet as the positive direction. The electrical angle is given as a rotational angle θ of the axis that passes through the U-phase coil and the d-axis.

2. Motor Currents Control Process

The motor control apparatus 10 of the embodiment controls the electric currents as described below with the drawing of FIG. 4. The flow of the electric current Au through the U-phase causes a magnetic field, which passes through the U-phase and has the strength that varies with the magnitude of the electric current Au. The U-phase current Au is accordingly expressed as a vector having the direction of the magnetic field and the magnitude Au. In a similar manner, the V-phase current Av and the W-phase current Aw flowing through the V-phase and the W-phase are expressed as vectors. An arbitrary electric current vector in the plane is given as the sum of electric current vectors in representative two directions. The representative two directions are, for example, a direction α and a direction β shown in FIG. 4. The electric current vector corresponding to a magnetic field occurring in an arbitrary direction in the plane of rotation of to the motor is expressed by electric currents Aα and Aβ flowing through the two-phase coils. In accordance with a concrete procedure, the electric currents Aα and Aβ that are equivalent to certain electric currents Au, Av, and Aw are expressed by Equations (3) given below:

$$A\alpha = Au - Av/2 - Aw/2$$
$$A\beta = (\sqrt{3}) \cdot (Aw - Av)/2 \tag{3}$$

In the case where Aα and Aβ are known, on the contrary, the respective phase currents Au, Av, and Aw are determined by Equations (4) given below, based on the condition that the total of the electric currents of the U, V, and W-phases is equal to zero (Au+Av+Aw=0).

$$Au = 2(\sqrt{3}-3) \cdot A\alpha/3$$
$$Av = (3-\sqrt{3}) \cdot (A\alpha - A\beta)/3$$
$$Aw = (3-\sqrt{3}) \cdot (A\alpha + A\beta)/3 \tag{4}$$

This is the generally known three phase-to-two phase conversion. The following describes the procedure of controlling the electric currents in the three-phase synchronous motor 40 with the electric currents Aα and Aβ after the three phase-to-two phase conversion.

The electric current vectors may be defined with respect to the magnetic fields occurring in the d-axis direction and the q-axis direction of FIG. 4. Magnitudes Ad and Aq of the electric current vectors in the d-axis direction and the q-axis direction are expressed with the electric currents Aα and Aβ in the direction α and the direction β as Equations (5) given below:

$$Ad = A\alpha \cdot \cos\theta + A\beta \cdot \sin\theta$$
$$Aq = -A\alpha \cdot \sin\theta + A\beta \cdot \cos\theta \tag{5}$$

In the case where Ad and Aq are known, on the contrary, Aα and Aβ are determined by Equations (6) given below:

$$A\alpha = Ad \cdot \cos\theta - Aq \cdot \sin\theta$$
$$A\beta = Ad \cdot \sin\theta + Aq \cdot \cos\theta \tag{6}$$

Specification of the electric currents flowing in the d-axis direction and the q-axis direction in the three-phase synchronous motor 40 determines the two-phase electric currents Aα and Aβ according to Equations (6) and the electric currents to be actually flown through the U, V, and W-phases according to Equations (4). This also determines the voltages to be applied to the U, V, and W-phases. The control of the electric currents in the three-phase synchronous motor 40 is based on this idea. Another possible arrangement directly specifies the relationship between the electric currents in the d-axis direction and the q-axis direction and the U, V, and W-phase currents, without using the electric current vectors in the directions α and β. In the following description, for example, the 'd-axis electric current and the q-axis electric current' imply the magnitude of the electric current vectors based on the idea discussed above. When the electric current flowing through the synchronous motor is divided into the d-axis direction and the q-axis direction, the q-axis electric current is a main dominant factor of the torque of the synchronous motor 40 as is generally known.

3. Motor Control Process at High-Speed Rotation

Figure 5:
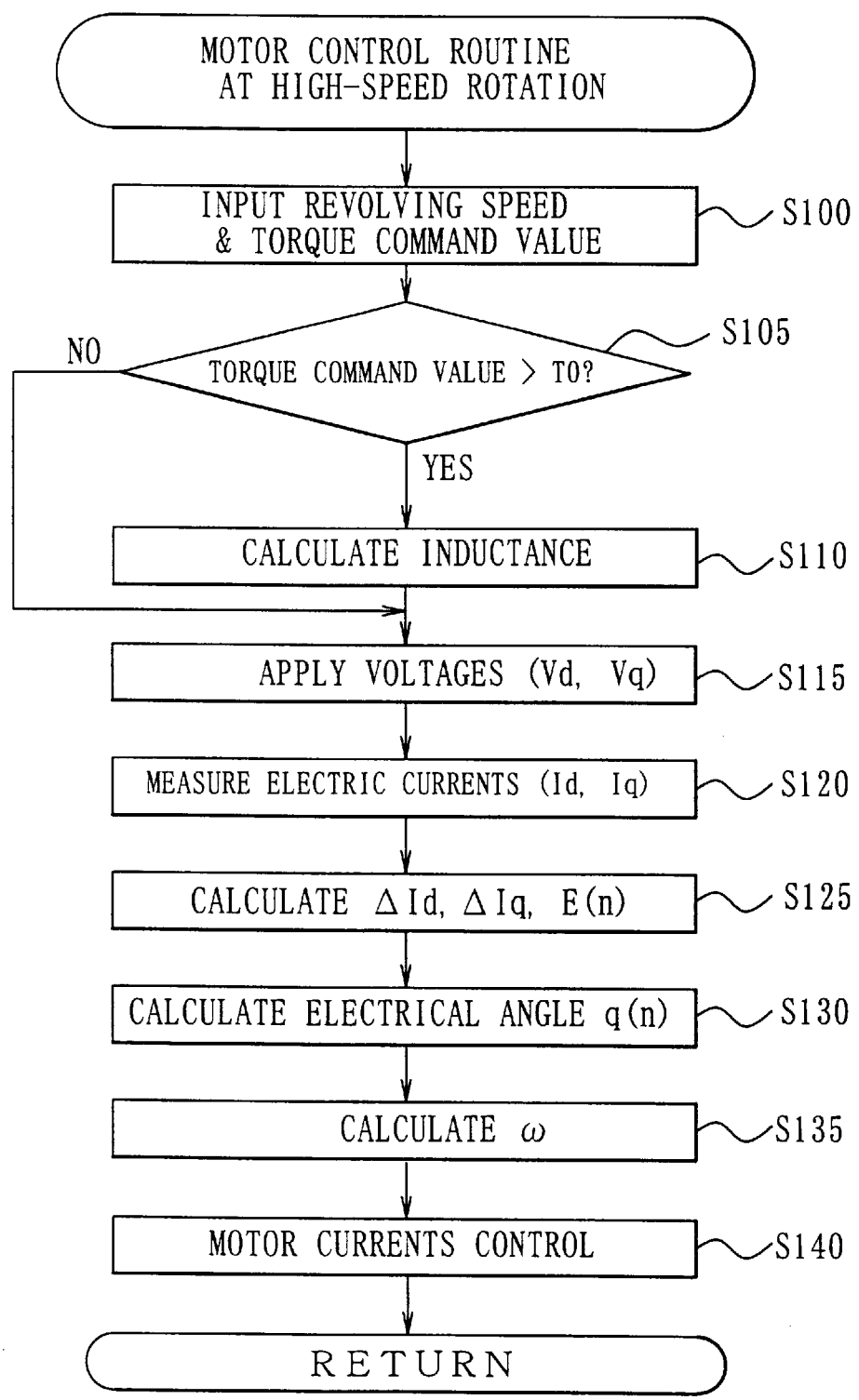
FIG. 5 is a flowchart showing a motor control routine at high-speed rotation.

FIG. 5 is a flowchart showing a motor control routine at high-speed rotation, which is carried out to control the motor that is in the state of high-speed rotation. The CPU 120 of the control ECU 100 shown in FIG. 1 periodically executes this routine with other control processes.

When the program enters the motor control routine at high-speed rotation, the CPU 120 first inputs a revolving speed and a torque command value of the three-phase synchronous motor 40 at step S100. This is because the revolving speed is required for calculation of an inductance and the inductance is varied with a variation in torque command value as discussed later. If there are any quantities of state other than the revolving speed and the torque command value, which are required for the calculation of the inductance, it is preferable that the other quantities of state are also input at step S100. The quantities of state, such as the torque command value, may be input externally via the input port 116 or may alternatively be calculated from a variety of externally input data by the CPU 120.

At subsequent step S105, the input torque command value is compared with a predetermined torque T0. In the case where the torque command value is greater than the predetermined torque T0, it is required to change the inductance with a variation in torque. The CPU 120 accordingly calculates the inductance at step S110. In the case where the torque command value is not greater than the predetermined torque T0, on the other hand, the program skips the processing of step S110. In this case, the inductance is fixed to a predetermined constant. Strictly speaking, the inductance is varied even when the torque command value is not greater than the predetermined torque T0. Another possible procedure accordingly omits the decision of step S105 and carries out the calculation of the inductance at step S110, irrespective of the magnitude of the torque command value.

The predetermined torque T0 is experimentally set, based on a specific torque that does not allow the inductance to be fixed to the predetermined constant. In this embodiment, a value that is a little smaller than the specific torque is set to the predetermined torque T0.

The calculation of the inductance at step S110 is the most characteristic of the embodiment and will be discussed later in detail. Here its is assumed that the inductance is calculated from the revolving speed of the three-phase synchronous motor 40 and the torque command value.

The CPU 120 applies voltages Vd and Vq to the d-axis and q-axis at step S115, and measures electric currents Id and Iq flowing through the d-axis and the q-axis in response to the applied voltages Vd and Vq at step S120. The d-axis and the q-axis are defined according to the electrical angle of the motor as described previously (see FIG. 4). The CPU 120 can not accurately detect the electrical angle at the time of applying the voltages and thereby applies the voltages based on an estimated electrical angle (corresponding to θc in FIG. 4). The estimated electrical angle is also used for the measurement of the electric currents.

The CPU 120 then calculates ΔId, ΔIq, and E(n) from the applied voltages and the observed electric currents at step S125. ΔId and ΔIq denote errors of the electric currents Id and Iq, and E(n) represents a value relating to the electromotive force based on the rotation of the rotor 50. These values are obtained by Equations (7) through (9) given below:

$$\Delta Id = Id(n) - Id(n-1) - t(Vd - RId + \omega LqIq)/Ld \quad (7)$$

$$\Delta Iq = Iq(n) - Iq(n-1) - t(Vq - RIq - \omega LdId - E(n-1))/Lq \quad (8)$$

$$E(n) = E(n-1) - K1\Delta Iq \quad (9)$$

The variables Id and Iq denote the electric currents flowing through the d-axis and the q-axis. The subscripts (n) and (n−1) are attached to the variables, based on the fact that the motor control routine at high-speed rotation is periodically repeated. The subscript (n) shows that the values are obtained at step S120 in the current cycle of the motor control routine at high-speed rotation, and the subscript (n−1)shows that the values are obtained in the previous cycle of the motor control routine at high-speed rotation. The expression Id(n)−Id(n−1) accordingly represents a variation in electric current Id from the previous cycle to the current cycle of the motor control routine at high-speed rotation. The value t denotes the cycle at which the motor control routine at high-speed rotation is carried out.

The variables Vd and Vq denote the voltages applied to the windings, ω the rotational angular velocity of the motor, and Ld and Lq the inductances in the d-axis direction and the q-axis direction. The rotational angular velocity ω is expressed in the unit of rad/sec, and a relation of ω=2π·N/60 is valid between the rotational angular velocity ω and the revolving speed N (rpm) of the motor. The constant K1 is experimentally specified and denotes the gain that correlates E(n), E(n−1), and ΔIq and is used for calculation of the electrical angle.

At step S130, the CPU 120 calculates an electrical angle θ(n) from ΔId, ΔIq, and E(n) obtained at step S125 according to Equation (10) given below:

$$\theta(n) = \theta(n-1) + tE(n)/K2 + \text{sgn} \cdot K3 \cdot \Delta Id \quad (10)$$

where the operator 'sgn' denotes '+' in the case of ω>0 and '−' in the case of ω<0. Like the constant K1, the constants K2 and K3 are experimentally specified and denote the gains used for calculation of the electrical angle. The motor control process is on the assumption that the motor is in the state of rotation, and does not take into account the case where the motor is at a stop, that is, in the case of ω=0.

In Equation (10) given above, θ(n−1) denotes the electrical angle calculated in the previous cycle of the motor control routine at high-speed rotation. This corresponds to the electrical angle θc estimated by the CPU 120 at steps S115 and S120 in the current cycle of the motor control routine at high-speed rotation. Equation (10) corrects the electrical angle θ(n−1) estimated by the CPU 120 with the values of E(n) and ΔId, so as to calculate the new electrical angle θ(n). This correction procedure is known in the conventional technique that detects the electrical angle of the synchronous motor in a sensor-less manner.

At subsequent step S135, the CPU 120 calculates the rotational angular velocity ω according to Equation (11) given below:

$$\omega = tE(n)/K2 + \text{sgn} \cdot K3 \cdot \Delta Id \quad (11)$$

The variables used here are those explained above. The calculated value ω is used for the arithmetic operations at step S125 (Equations (7) through (9)) in the next cycle of the motor control routine at high-speed rotation.

The CPU 120 then carries out the motor current control based on the calculated electrical angle θ(n) at step S140. As described in "2. Motor Currents Control Process", the CPU 120 determines the d-axis electric current and the q-axis electric current, which are to be flown in the motor in response to the torque command value, and carries out the two phase-to-three phase conversion in order to determine the electric currents that are to be flown through the U, V, and W-phases.

4. Calculation of Inductance (Example 1)

Figure 6:
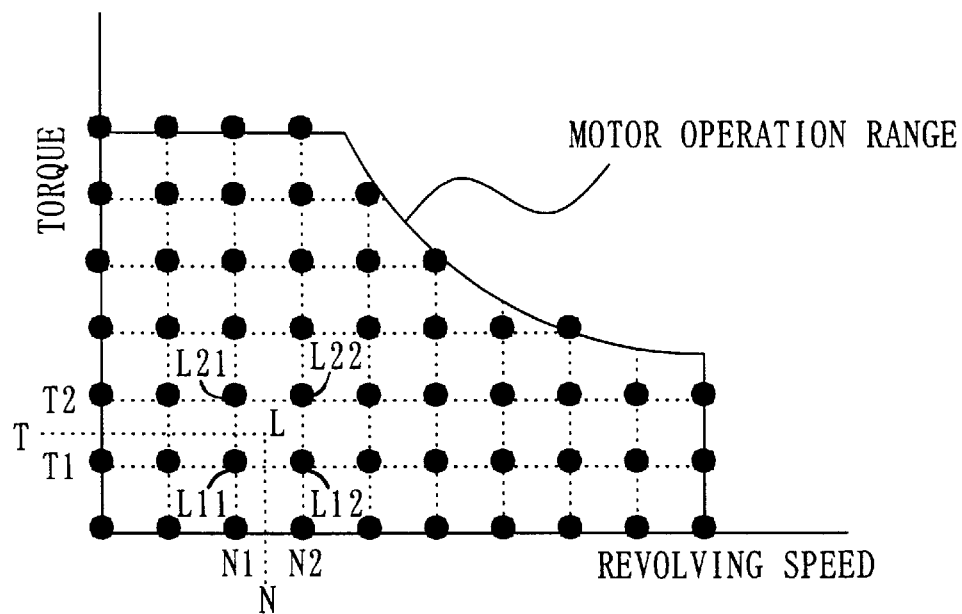
FIG. 6 shows measurement points of the inductance in a motor operation range.
Figure 7:
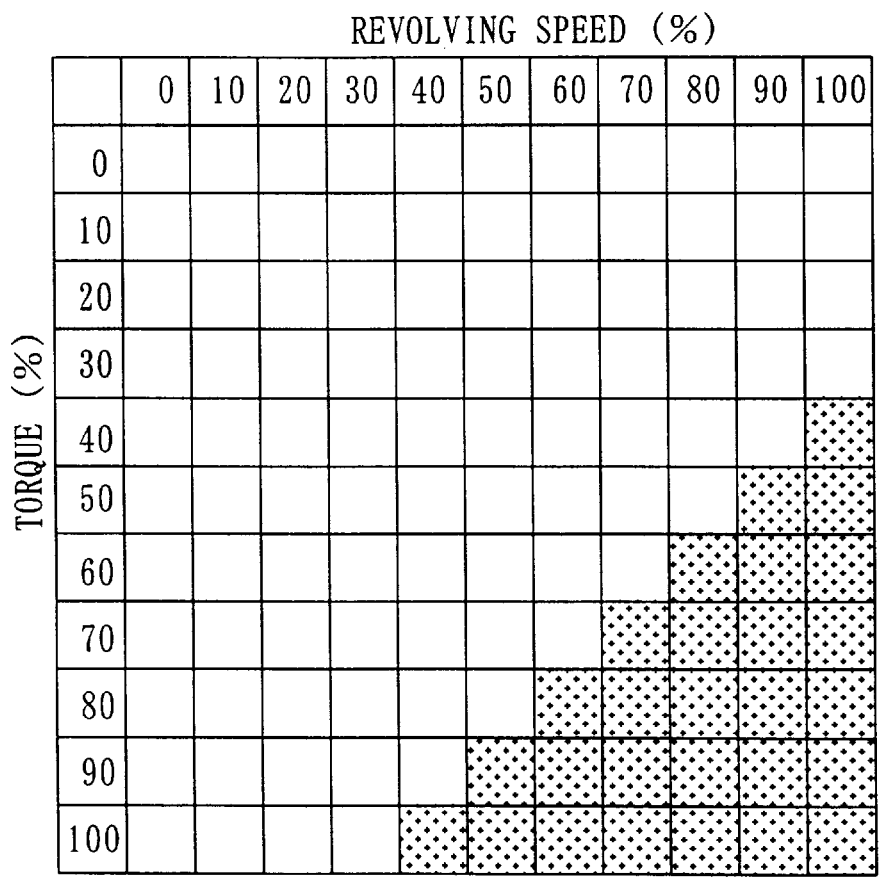
FIG. 7 shows a table in which the relationship between the inductance and the motor driving state is stored.

A first example of the calculation of the inductance (at step S110 in the flowchart of FIG. 5), which is the most characteristic of the embodiment of the present invention, is described with FIG. 6. FIG. 6 shows measurement points of the inductance in a motor operation range defined by the revolving speed and the torque. As shown in FIG. 6, the motor control apparatus 10 of the embodiment divides the revolving speed and the torque by a plurality of lattice points in the motor operation range, experimentally measures the inductance in the driving states corresponding to the respective lattice points, and stores the results of the measurement into the ROM 122 (see FIG. 1). The inductances are stored in the form of a table as shown in FIG. 7. The hatched portion in FIG. 7 corresponds to an area out of the motor operation range.

Figure 10:
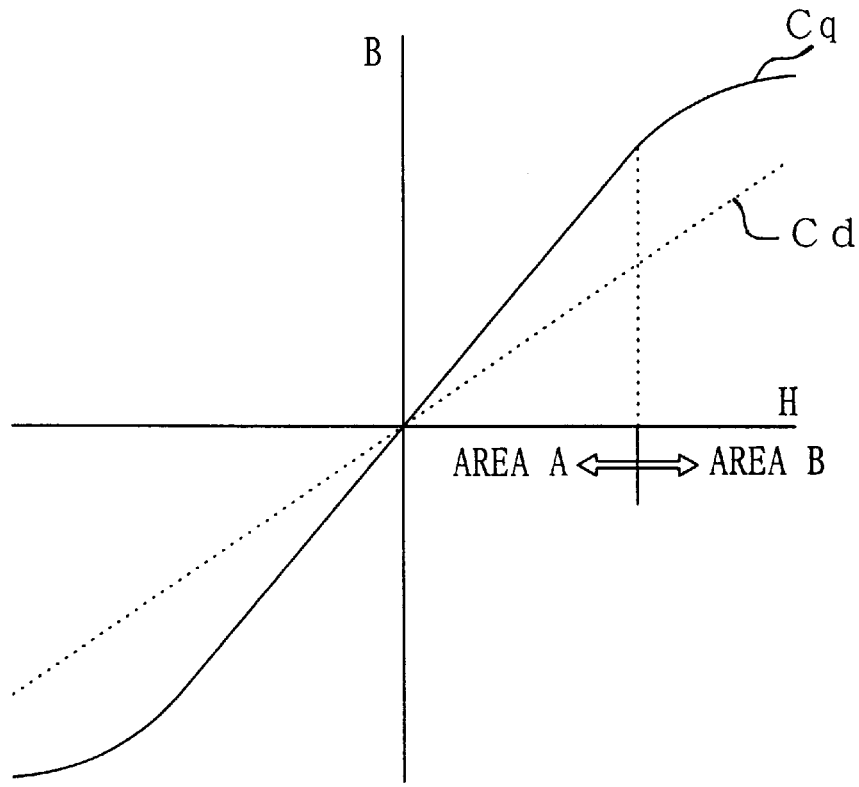
FIG. 10 is a graph showing the magnetic saturation characteristics of the motor.
Figure 11:
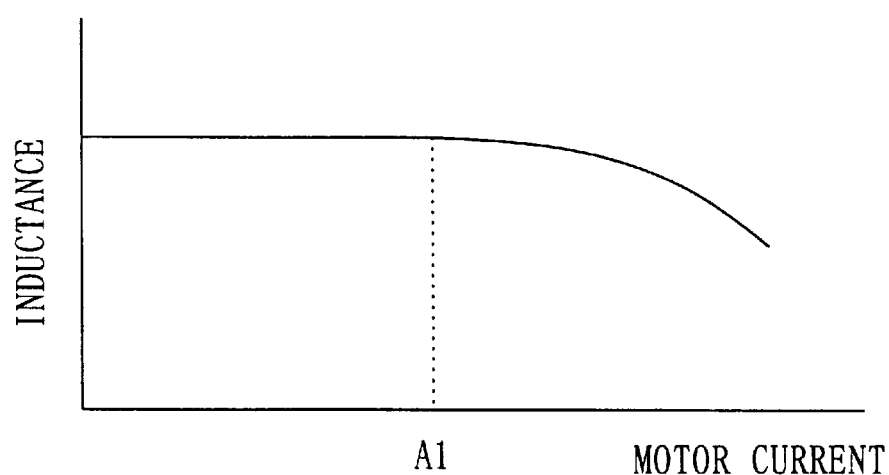
FIG. 11 is a graph showing the relationship between the inductance and the motor current.

For convenience of explanation, in the drawings of FIGS. 6 and 7, the lattice points at which the inductance is measured are arranged at fixed intervals in the motor operation range. The lattice points may, however, be arranged at varied intervals. As described previously with FIGS. 10 and 11, the inductance plotted against the motor driving state decreases non-linearly after the torque exceeds a predetermined level. In the range where the torque is smaller than the predetermined level, the inductance is measured at roughly divided lattice points. In the range where the torque is not smaller than the predetermined level, on the other hand, the inductance is measured at minutely divided lattice points, in order to allow sufficient approximation of the inductance that varies non-linearly. This arrangement is also applicable to the case where the inductance depends upon the revolving speed of the motor and the revolving speed is divided by the plurality of lattice points. It is not necessary that the number of divisions of the torque is identical with the number of divisions of the revolving speed.

In this embodiment, the table shown in FIG. 7 is provided respectively for the inductance Ld of the d-axis and the inductance Lq of the q-axis. Another preferable application provides the table of FIG. 7 for a composite inductance, which is obtained by combining the inductance of the d-axis with the inductance of the q-axis. Still another application provides the table of FIG. 7 for only either the inductance of the d-axis or the inductance of the q-axis. In the case where the calculation of the inductance is carried out at step S110 only when the torque command value of the motor is not smaller than the predetermined torque T0, the table of FIG. 7 may be provided only for this range.

The following describes a method of experimentally measuring the inductances Ld and Lq of the motor. The voltage equations (1) and (2) given above are rewritten in the stationary state, that is, under the condition that the term of the time derivative is equal to zero. This yields Equations (12) and (13) given below:

$$Ld=(Vq-R \cdot Iq-\omega\phi) \cdot Id/\omega \quad (12)$$

$$Lq=(R \cdot Id-Vd) \cdot Iq/\omega \quad (13)$$

The motor resistance R in Equations (12) and (13) is calculated from a voltage drop observed under the condition of a flow of direct electric current according to the Ohm's law (voltage=electric current×resistance). In Equation (12), $\omega$ is calculated from an electromotive force occurring in the motor when a motor terminal is released and an external torque is applied to the rotating shaft to rotate the motor. When the motor terminal is released, the voltage equation (2) is rewritten as $Vq=\omega \cdot \phi$, so that $\phi$ is calculated by measuring the rotational angular velocity $\omega$ of the motor in response to the external torque and the electromotive force Vq occurring in this state.

Namely the inductances Ld and Lq are calculated from the observed electric currents Id and Iq and the observed voltages Vd and Vq according to Equations (12) and (13). The measurable values in the motor are the electric currents and the voltages of the respective phases, so that the electric currents Id and Iq and the voltages Vd and Vq should be calculated from these measurable values. The following describes a method of determining the electric currents Id and Iq and the voltages Vd and Vq in the example that an electric current Iu flowing through the U-phase and a voltage Vuv between the U-phase and the V-phase are measured.

Both the electric current Iu and the voltage Vuv periodically change with a variation in electrical angle and have effective values I1 and V1, respectively. It is assumed that $\gamma$ denotes a phase shift of the voltage Vuv, that is, an electrical angle under the condition of Vuv=0, and $\delta$ denotes a phase shift of the electric current Iu, that is, an electrical angle under the condition of Iu=0. These electrical angles are measured with an angular sensor attached to the motor. The motor of this embodiment measures the electrical angle in the sensor-less manner and does not have an angular sensor, which is, however, attached for measurement of the inductance.

As is known, the electric currents Id and Iq and the voltages Vd and Vq are expressed by Equations (14) given below:

$$Id=-(\sqrt{3}) \cdot I1 \cdot \sin \delta$$

$$Iq=(\sqrt{3}) \cdot I1 \cdot \cos \delta$$

$$Vd=-V1 \cdot \sin (\gamma - \pi/6)$$

$$Vq=V1 \cdot \cos (\gamma - \pi/6) \quad (14)$$

The inductances Ld and Lq are obtained by substituting Equations (14) into Equations (12) and (13).

The table stores the inductance corresponding to the revolving speed of the motor and the torque. Another possible application provides a three-dimensional or higher-dimensional table that stores the inductance corresponding to other quantities of state that affect the inductance.

The calculation of the inductance (step S110 in the flowchart of FIG. 5) in the motor control routine at high-speed rotation interpolates the table according to the revolving speed of the motor and the torque command value, so as to calculate the inductances Ld and Lq. The conventional linear interpolation technique is applied for the interpolation. A concrete procedure interpolates four inductances L11, L12, L21, and L22 corresponding to revolving speeds N1 and N2 and torques T1 and T2 and determines an inductance L corresponding to a revolving speed N and a torque T as shown in FIG. 6.

In this case, the procedure first interpolates the inductances L11, L12, L21, and L22 and determines an inductance L1 corresponding to the revolving speed N and the torque T1 and an inductance L2 corresponding to the revolving speed N and the torque T2 according to Equations (15) given below:

$$L1=(L12-L11) \cdot C1+L11$$

$$L2=(L22-L21) \cdot C1+L11 \quad (15)$$

where $C1=(N-N1)/(N2-N1)$.

The procedure then interpolates the inductances L1 and L2 and determines the inductance L corresponding to the revolving speed N and the torque T according to Equation (16) given below:

$$L=(L2-L1) \cdot C2+L1 \quad (16)$$

where $C2=(T-T1)/(T2-T1)$.

One possible modification changes the order of the arithmetic operations, that is, carries out interpolation with the torque and then with the revolving speed. Another possible modification determines the inductance L directly according to Equation (17) given below:

$$L=C1 \cdot C2(L22+L12-L21-L11) +C1(L12-L11)+C2(L21-L11)+L11 \quad (17)$$

The technique of this embodiment carries out the linear interpolation by taking into account the high-speed processing. Another available technique carries out the interpolation of the higher accuracy by taking into account a non-linear variation in motor inductance. In the case of a three-dimensional or a higher-dimensional table, the above technique of interpolation may be expanded to each dimension, or any one of the known techniques may be applied for the interpolation corresponding to each dimension.

5. Calculation of Inductance (Example 2)

Figure 8:
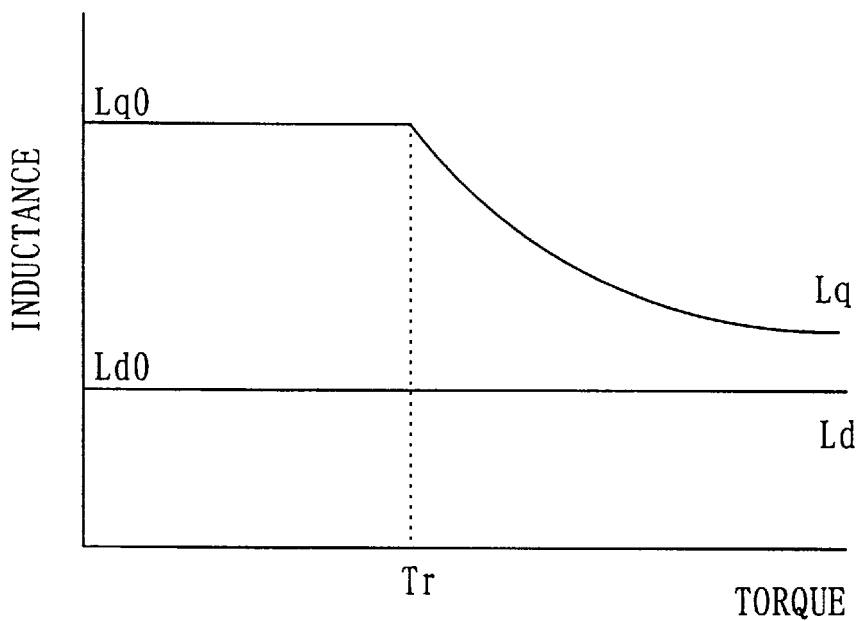
FIG. 8 is a graph showing a first model of the relationship between the inductance and the torque.

The following describes a second example of the calculation of the inductance with FIG. 8. The graph of FIG. 8 shows variations in inductances Ld and Lq plotted against the torque. The inductances were measured according to the method described above. The inductance Ld in the d-axis direction had a substantially fixed value, whereas the inductance Lq in the q-axis direction decreased non-linearly at the torque of not less than a value Tr. These values hardly depend upon the revolving speed of the motor 40 adopted in this embodiment.

Based on such measurements, in this embodiment, the inductance Lq at the torque T of not less than the value Tr is expressed in the form of a second-order function as Equation (18) given below. Strictly speaking, the graph of FIG. 8 shows the variations in inductances simulated by Equation (18).

$$Lq=a(T-Tr)^2+b(T-Tr)+Lq0 \qquad (18)$$

where a and b are constants and the operator ^ denotes power.

The technique applied for the calculation of the inductance (step S110 in the flowchart of FIG. 5) in the motor control routine at high-speed rotation substitutes the torque command value of the motor into Equation (18), so as to calculate the inductance Lq. The applied function is not restricted to the second-order function but may be any function that sufficiently approximates the inductance. The inductance Lq actually varies even under the condition of the torque T<Tr. A function that is valid over the whole range of the torque T≧0 may thus be applied for the calculation of the inductance. Alternatively different functions may be adopted for the torque range of T<Tr and for the torque range of T≧Tr. In the case where the inductance Ld varies with a variation in torque, a function may be applied to calculate the inductance Ld.

In this embodiment, the inductance hardly depends upon the revolving speed of the motor, so that the inductance is expressed as a function of the motor torque as shown by Equation (18) given above. When the inductance depends upon the revolving speed of the motor, the inductance may be expressed as a function of two variables, that is, the torque and the revolving speed. The inductance may alternatively be expressed as a function of any quantities of state other than the motor torque and the revolving speed, which affect the inductance, as variables.

The motor control apparatus of the embodiment varies the inductance according to the motor driving state and thereby enables the electrical angle of the motor to be detected with a high accuracy even when a large torque is required. The motor control apparatus thus carries out appropriate control, in order to enable the motor to be driven with a high efficiency.

The technique discussed in "4. Calculation of Inductance (Example 1)" interpolates the table, which stores the inductances corresponding to the motor driving states, in order to calculate the inductance. This structure stores the observed inductances directly as the data in the table and is thus realized relatively easily.

The technique discussed in "5. Calculation of Inductance (Example 2)" approximates the measurements of the inductance with a function. This arrangement reduces the amount of data to be stored, compared with the structure using the table. In the case that the function is expressed in a relatively simple form, this arrangement shortens the time required for the calculation of the inductance.

Figure 9:
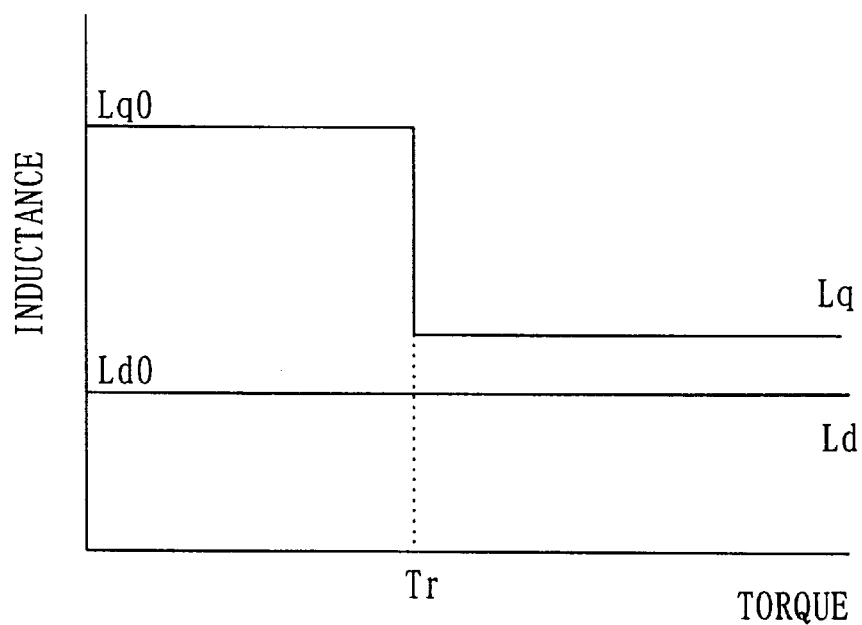
FIG. 9 is a graph showing a second model of the relationship between the inductance and the torque.

The present invention is not restricted to the above embodiment or its modifications, but there may be many other modifications, changes, and alterations without departing from the scope or spirit of the main characteristics of the present invention. By way of example, the inductance may be decreased stepwise at the torque of not less than the value Tr as shown in the graph of FIG. 9. Although the model of FIG. 9 has a two-step change, the applied model may have a change of greater steps. Compared with the conventional technique, the structure of approximating the variation of the inductance with a model enables the electrical angle of the motor to be detected with a smaller error and assures adequate control of the motor. The technique of varying the inductance with the approximate model can be realized more readily than the other techniques described above.

It should be clearly understood that the above embodiment is only illustrative and not restrictive in any sense. The scope and spirit of the present invention are limited only by the terms of the appended claims.

What is claimed is:

1. A motor control apparatus that controls a synchronous motor, which rotates a rotor via an interaction between a magnetic field produced by a flow of multi-phase alternating current through a winding and a magnetic field by a permanent magnet, said motor control apparatus comprising:

a correction computation unit that calculates a quantity of correction of an electrical angle, which is estimated at a specific timing, from a voltage applied to said winding based on the estimated electrical angle, an electric current flowing through said winding in response to the applied voltage, and an inductance of said winding, which depends upon characteristics of said synchronous motor; and a control unit that estimates an electrical angle at a subsequent timing, based on the calculated quantity of correction and the estimated electrical angle at the specific timing, thereby regulating the multi-phase alternating current flown through said winding, wherein said correction computation unit comprises:

a parameter input unit that reads a parameter representing a driving state of said synchronous motor; and an inductance determination unit that determines the inductance based on said parameter.

2. A motor control apparatus in accordance with claim 1, wherein said parameter comprises a torque of said synchronous motor.

3. A motor control apparatus in accordance with claim 1, wherein said inductance determination unit comprises:

a memory that stores a table, which represents a relationship between finite driving states, which are expressed by said parameter, and inductances corresponding to the finite driving states; and an accumulator that interpolates said table and thereby calculates an inductance corresponding to each value of said parameter.

4. A motor control apparatus in accordance with claim 1, wherein said inductance determination unit comprises:

a memory that stores a function, which expresses the inductance using said parameter as a variable; and an accumulator that substitutes a value of said parameter into the variable of said function, so as to determine the inductance.

5. A motor control apparatus in accordance with claim 1, wherein said correction computation unit calculates the quantity of correction from the inductance determined by said inductance determination unit when a torque to be output from said synchronous motor is not less than a predetermined level, said correction computation unit otherwise fixing the inductance to a predetermined constant and calculating the quantity of correction, where the estimated electrical angle at the current timing is corrected with the calculated quantity of correction.

6. A method of controlling operation of a synchronous motor that rotates a rotor via an interaction between a magnetic field produced by a flow of multi-phase alternating current through a winding and a magnetic field by a permanent magnet, said method comprising the steps of:

(a) reading a parameter that represents a driving state of said synchronous motor;

(b) applying a voltage to said winding based on an electrical angle, which is estimated at a specific timing, and making an electric current flow through said winding;

(c) measuring the electric current flown through said winding, in response to the applied voltage;

(d) specifying an inductance of said winding, based on said parameter;

(e) calculating a quantity of correction of the estimated electrical angle from the applied voltage, the observed electric current, and the specified inductance; and (f) estimating an electrical angle at a subsequent timing, based on the estimated electrical angle at the specific timing and the calculated quantity of correction.

* * * * *